2 Sheets—Sheet 1.
C. H. EISENBRANDT.
Car Brake.
No. 20,339. Patented May 25, 1858.
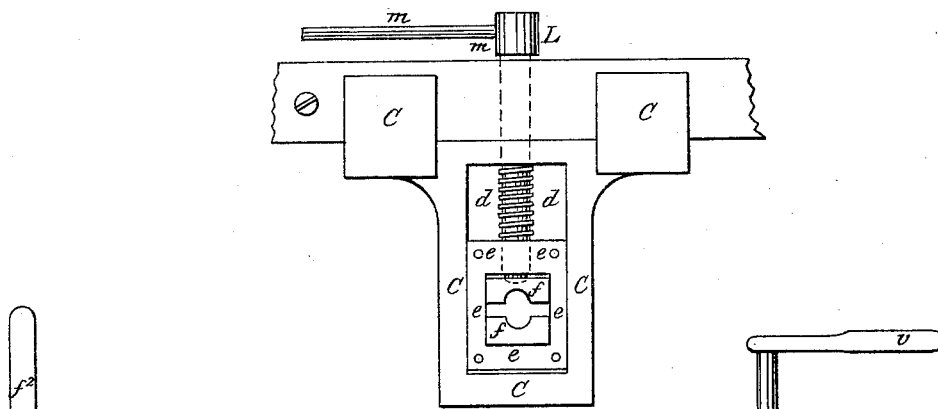
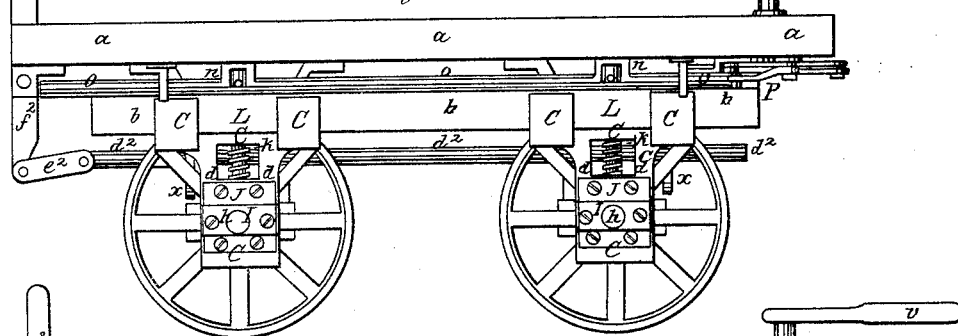
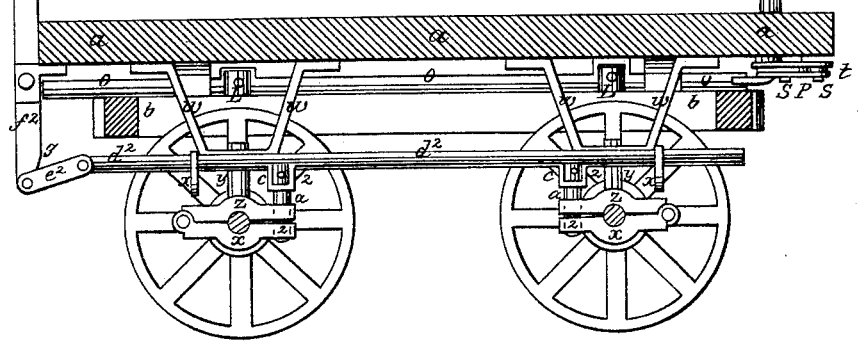

2 Sheets—Sheet 2.

C. H. EISENBRANDT.
Car Brake.

No. 20,339.

Patented May 25, 1858.

UNITED STATES PATENT OFFICE.

C. H. EISENBRANDT, OF BALTIMORE, MARYLAND.

RAILROAD-CAR BRAKE.

Specification of Letters Patent No. 20,339, dated May 25, 1858.

*To all whom it may concern:*

Be it known that I, CHRISTIAN HENRY EISENBRANDT, of the city of Baltimore, in the State of Maryland, have invented and made certain new and useful Improvements in Railroad-Car Brakes, which I term the "Direct-Action Screw-Brake;" and I do hereby declare that the following is a full, clear, and exact description of the same, reference being had to the accompanying drawings, making a part of this specification.

Figure 2:
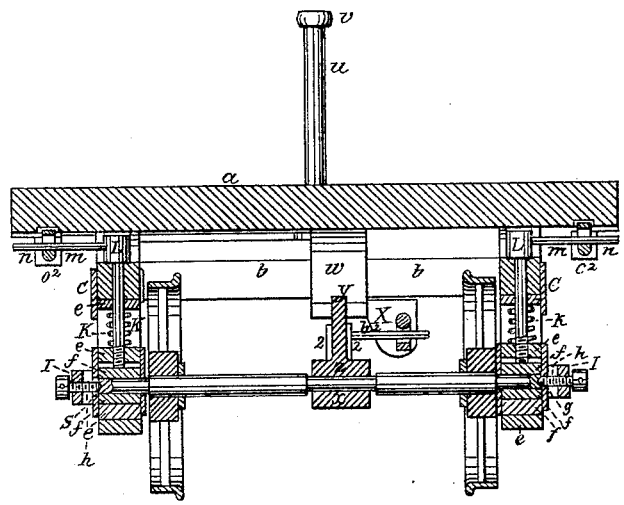
Figure 4:
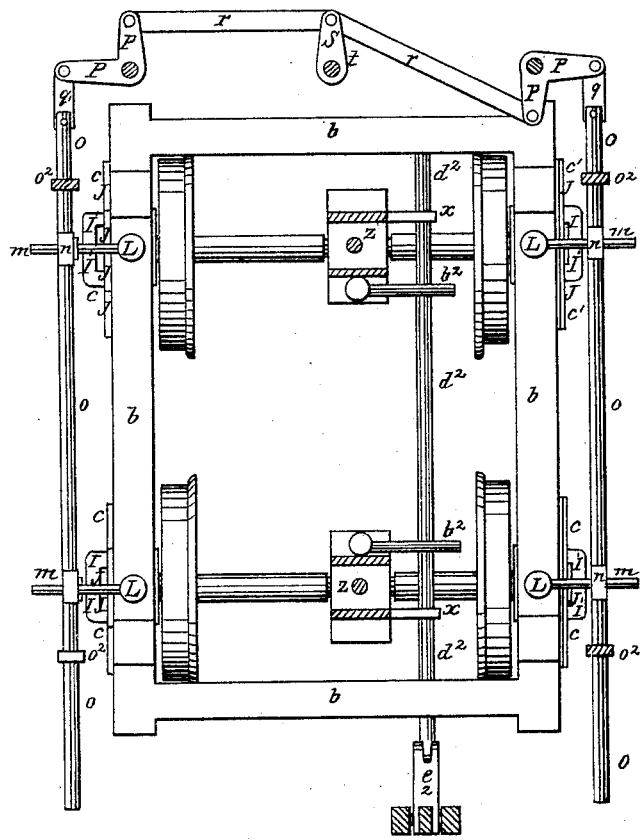

Figure 1, is a longitudinal, side elevation. Fig. 2, is a transverse, vertical sectional view. Fig. 3 is a central, longitudinal sectional view. Fig. 4 is a top view of the car-truck, with platform or flooring detached. Fig. 5 pendant box bearings.

The nature of my improvements consists in constructing a car brake, wherein by peculiarly arranged mechanism, can be applied the principles of the screw and lever, directly to the axles of car wheels in a manner which will hereinafter be more fully set forth.

In Fig. 1, is represented an ordinary truck or platform $a, a, a, a$, provided underneath with a running gear or wheel part $b, b, b, b$. At $c, c, c, c$, are pendant box-bearings attached to the running gear part. These pendant-box bearings, are formed with a slot or rectangular opening, of required size, as at $d, d, d, d$, and as at the dots in Fig. 1. Within said opening, is a neatly fitted sliding axle seat as at sections $e, e, e, e$, Figs. 2 and 5. Within these sliding axle seats, are inserted collar boxes $f, f, f, f$, Figs. 1 and 5, and between these collar boxes, work the ends of the axle, said ends being made concave or hollow, as at $g, g$, Fig. 2, into which concavities are to work the ends of corresponding, screw, adjusting pivots $h\ h$, said pivots, working through a yoke or bridge bearings $i, i, i, i$, resting on a face or guard plate $J, J, J, J$, screwed on to the sides of the pendant box-bearings, as shown in Figs. 1, 2, 3.

In Figs. 1, and 2, within the openings $d, d, d, d$, are vertically arranged helical springs $k, k, k, k$. Passing downwardly through them, are screws, as shown at the dots, and at $L, L, L, L$ Figs. 1, 2, 3, 4, 5. Into the head of these vertical screws, are lever arms, $m, m, m\ m$, extending outwardly as in Figs. 2, 4, 5. The lever arms of the screw, work in eye slots $n, n$, formed on longitudinally arranged, sliding connection, actuating rods $o, o, o$, one on each side of the truck, beneath the platform of the cars, and are held in position by bracket guides $o^2$. To the ends of the sliding connection or actuating rods, are bell crank lever, connecting devices P, P, P, P, and joints $q, q$, attached to connecting rods $r, r,$ by a joint, or pin bolt $s$, inserted into the end of an arm $t$, attached to a vertical shaft $a$, extending upwardly through the platform of the truck, or car body, and having a lever handle U.

The rods $o, o, o$, can be connected by detachable joints throughout the extent of a train of cars, and communicate with the engine or locomotive, and either operated by the engineer solely, or by a brakeman on each car.

In Fig. 3 are pendant bracket standards $w, w, w$, attached to the underside of the bottom or platform of the car, and to the transverse side of these pendant brackets or standards, are screwed or fastened in any suitable secure manner ear guides X, X. And pendant from beneath, and inserted into the head of the pendant bracket standard $x\ x$, is a shank or stem $y, y$, having a collar grip-piece $z, z, z, z$ formed on, or attached thereto; and hinged or screwed to said piece is a corresponding collar grip-piece &, &, &. Through the open ends of these grip pieces, passes a vertical screw $a^2, a^2, a^2$, Figs. 2, 3, 4, and to the head of the screw is a right angle lever rod or arm $b^2, b^2, b^2, b^2$, Figs. 2, 4, the end of said lever rod or arm, working in eyes or slots $c^2$—$c^2$, Fig. 3, formed on a sliding actuating yoke rod, $d^2, d^2, d^2$. This rod is supported by ear guides X, X. To the ends of said rod, may be links, joints, or catches $e^2$—$e^2$—$e^2$, which can be connected to a vertical lever $f^2, f^2$—$f^2, f^2$.

Each series of these brake appliances, can be united, and thereby the whole train of cars may be connected or coupled together, and controlled by separate brakemen, or by the engineer as hereinbefore mentioned.

In all applications heretofore of retarding appliances, or brakes for cars, the action has been on the circumference of the wheels, by rubber or buffer blocks; or by friction rollers; or by pressure through the intervention of lever chains, and buffer heads. And I am well aware that various modes have been resorted to, and applied to the axles of cars; but in all such cases, the mechanism, has been more or less complicated, costly, and liable to get out of order; and as the action of the power applied, is not direct, but transmitted, consequently there must result therefrom a considerable loss of power and great inequality of action of the mechanism.

In my mode of checking the momentum of cars, I bring into requisition, the united or compound action, of the two principal mechanical powers, the screw, and lever, and instead of using them as the main or primary principles of power, or as auxiliary agents to operate other devices, I reverse their application, and apply them through the intervention of other transmitting agents, and thereby making their action direct upon the circumference of the axle of the car, as shows in Fig. 1, at $d$, $d$, $d$, L, and in Fig. 5, and at $f$, $f$, L, Fig. 2, and where the grip-collars Z, &—$a^2$—$b^2$, clasp or hug the circumference of the axle, diffusing the compound power of the lever and screw and thereby making the friction equal around the face of the axle of the wheels, whereas if the resistance or pressure of the brake be applied in part, around the periphery or face of the wheel, or even upon the lateral surface thereof, a partial and unequal action is produced, and consequent upon this, in the operation of such brakes, if the action thereof is too quick; the checking of the momentum will be such as to produce a sudden jerk, or shock, liable under many circumstances to produce undue torsion of the wheels, twisting of the axle, and shattering of the mechanism of the brake, and causing more or less concussion or jarring and tending to accidents.

It will be observed, that in the use and operation of my improvements, the usual friction or abrasion, incidental to the axle ends, working closely in contact with their boxes, or journal places, is entirely done away with for the ends of the axles do not revolve or bear on the surfaces of the boxes, but as hereinbefore mentioned, the axle ends, revolve on socket or pivot adjusting screws as at $g$, $g$—$h$, $h$, Fig. 2, and hence less friction or resistance must ensue, and consequently the revolution of the axles, must be more uniform, and smoother, and therefore the grip collars, and clasping boxes $f$, $f$—&, $z$ Fig. 2, when brought in contact with the whole circumference of the axle, act most promptly and effectually, and with such perfect uniformity of pressure, simultaneousness and precision, that no matter what may be the velocity of the train the momentum can be overcome, instantaneously, and with such smoothness of action as to entirely prevent any concussion or jarring of the cars, or to produce the slightest injury to the mechanism employed.

Having described the construction, nature and operation of my improvements in as full a manner as is deemed essential to demonstrate the principles pertaining thereto, and being well aware that rubber devices, and friction rollers have been applied to the partial surface of axles, such devices, therefore I do not claim, but—

What I do claim, and desire to secure by Letters Patent of the United States, is—

The manner or mode of direct application to the axles of wheels of the lever and screw, L, $m$, $m$—$a^2$—$b^2$, with the clasping boxes $f$, $f$,—gripping collars Y, Z, &,—the pivot and socket axles $g$, $h$—$g$, $h$—the pendant bearings $c$, $c$, $c$, with the box seats $e$, $e$, $e$ Figs. 2 and 5—the connecting, yoke eye rods $c^2$—$d^2$, $o$, $o$, $o$, the ear guides $x$, $x$,—the whole arranged, combined, and operated with the other devices, hereinbefore described, and substantially in the manner set forth.

CHRISTIAN HENRY EISENBRANDT. [L. S.]

Witnesses:
 WM. H. HAYWARD,
 D. D. GILL.